June 12, 1923.
F. E. MILLER
BRAKE LEVER SLOT CLOSURE
Filed April 17, 1922
1,458,839
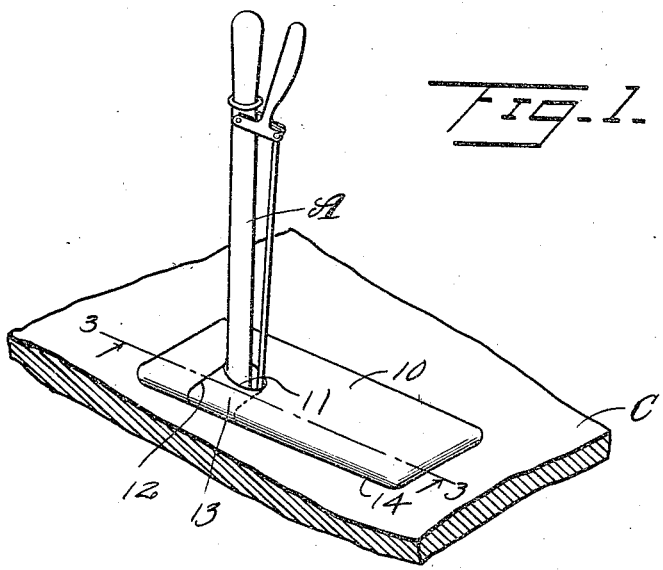
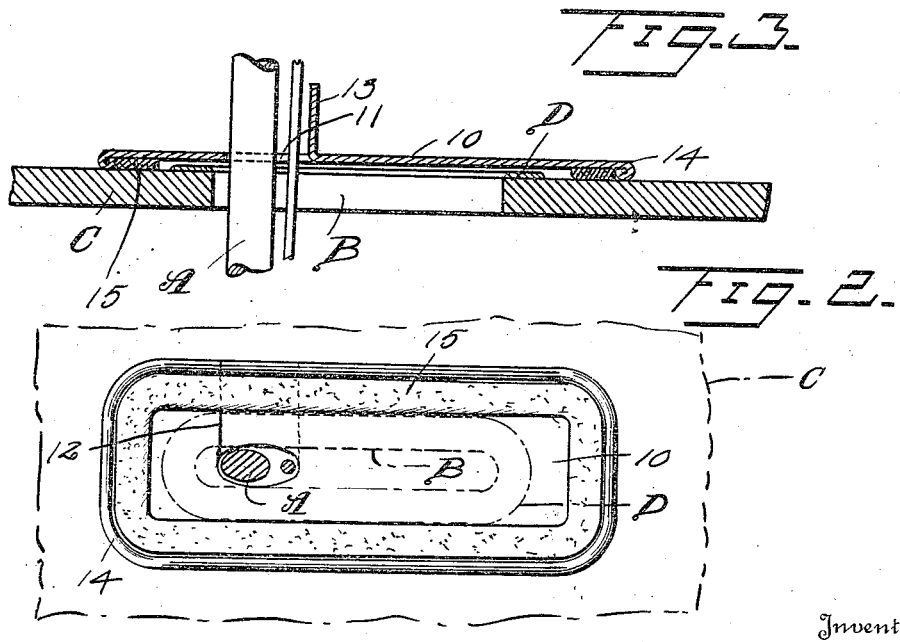
Inventor
F. E. Miller Patented June 12, 1923.

1,458,839

UNITED STATES PATENT OFFICE.

FRANK E. MILLER, OF ROBINSON, ILLINOIS.

BRAKE-LEVER SLOT CLOSURE.

Application filed April 17, 1922. Serial No. 553,674.

*To all whom it may concern:*

Be it known that I, FRANK E. MILLER, a citizen of the United States, residing at Robinson, in the county of Crawford and State of Illinois, have invented certain new and useful Improvements in a Brake-Lever Slot Closure; and I do hereby declare the following to be a full, clear, and exact description of the invention, such as will enable others skilled in the art to which it appertains to make and use the same.

This invention relates to a device for maintaining a slot in which a control element, such as an emergency brake lever on an automobile moves, in order to exclude the entrance of water, mud, dirt and air through said slot.

One important object is to provide a construction which may be attached to an emergency brake lever of an automobile, and positioned of itself, that is without the use of additional means or requiring a change in the construction of its adjacent parts.

Another object is to provide a construction in which the closure or plate cooperates with the metallic reinforcing plate of the slot to maintain the plate or closure in position.

Still another object is to provide a construction which may be made in a single piece, for instance from bendable sheet metal, and which has a bendable portion to facilitate its attachment to an emergency brake lever.

An additional object is to provide a construction in which felt or the like is employed and adapted for direct contact with the element in which the slot is provided to more effectively exclude the matter mentioned and which plate is preferably flanged or deflected at its border with the reinforcing frame mentioned and to retain the felt.

Additional objects and advantages will become apparent from a consideration of the description following taken in connection with the accompanying drawings illustrating one practical embodiment.

In said drawings:—

Figure 1 is a view in perspective, showing the closure in place;

Figure 2 is an inverted plan view and

Figure 3 is a cross sectional view on the line 3—3 of Figure 1, the fastening tongue being swung to open position as shown in dotted lines.

Like reference characters designate like or similar parts in the different views.

Referring specifically to the drawings, the emergency brake lever of an automobile is conventionally shown at A as movable in a slot B provided for instance in a floor board C. The slot B as is usually the case, is surrounded by an endless metallic reinforcing frame D.

The present invention consists of a plate or blank 10, preferably of a bendable metal, which may be substantially rectangular in shape or otherwise shaped according to conditions. The plate 10 has an opening 11 therein in which the lever A is adapted to be disposed substantially snugly but not so as to interfere with its movement forwardly or backwardly as is necessary in use. In order that the lever A may be disposed in the slot 11, the plate 10 is slit transversely at 12 so as to provide a tongue at 13, which is bendable into and out of the plane of the plate 10 as suggested in Figure 3. In order to attach the plate to the lever A, the tongue 13 is bent into the dotted line position of Figure 3 and the plate is moved so that the lever is disposed in slot 11 after which tongue 13 is bent to its formal position. In this position, the plate 10 rests loosely on the frame D so as to slide forwardly and rearwardly on said plate incidental to movement of the lever A.

The marginal edge of the plate 10 is curled or flanged downwardly as at 14, so as to engage the floor board C about the frame D which thus serves to position the plate 10.

In order to more securely close the slot B, a strip or endless lining of felt or other suitable material is used at 15 to form a gasket, being secured to the under surface of the plate in any suitable manner as by means of an adhesive or it may be connected to the frame D, as preferred.

With the plate 10 in position with lever A extending loosely therethrough as shown in the drawings, the slot B is effectively closed and the degree of closure is increased by the gasket 15. Thus as the lever A moves forwardly and rearwardly, the plate 10 accordingly slides, but without exposing the opening B.

Due to the downward extension of the flange 14, the edge of the plate 10 will not catch or hook into a carpet or rug placed on the floor board C.

Attention is also called to the fact that the device is easily installed, is durable and practically indestructible, is capable of expeditious manufacture in a single piece aside from the gasket 15 which may be employed or omitted as preferred.

As merely one practical embodiment has been illustrated and described, it is to be understood that changes in the details may be resorted to provided they wall within the spirit and scope of the invention.

I claim as my invention:—

As a closure means for a slot in which a control element operates, in combination with a frame surrounding the slot and rising from the member in which the slot is provided, a closure plate of bendable material having a slot for disposition of the element therein, said closure plate having a downwardly extending flange surrounding said frame to raise the plate with respect to the frame by engagement with said member, said closure plate being slit outwardly from one end of the second mentioned slot to the marginal edge of the plate to provide a single relatively long portion integral with the plate and bendable to facilitate attachment thereto and removal from the element, and said flange extending along said portion to reinforce it.

In testimony whereof I affix my signature in presence of two witnesses.

FRANK E. MILLER.

Witnesses:
   LELA MARTIN,
   JAMES R. LINDSAY.